(12) United States Patent
Shimozawa et al.

(10) Patent No.: US 7,548,494 B2
(45) Date of Patent: Jun. 16, 2009

(54) AUDIO SYSTEM, AND DISC REPRODUCTION DEVICE AND AUDIO OUTPUT CONTROL DEVICE FOR USE THEREIN

(75) Inventors: Dai Shimozawa, Neyagawa (JP); Hiroyuki Fukuma, Neyagawa (JP)

(73) Assignee: Onkyo Corporation, Neyagawa-shi (JP)

( * ) Notice: Subject to any disclaimer, the term of this patent is extended or adjusted under 35 U.S.C. 154(b) by 867 days.

(21) Appl. No.: 11/226,676

(22) Filed: Sep. 14, 2005

(65) Prior Publication Data
US 2006/0093330 A1 May 4, 2006

(30) Foreign Application Priority Data
Oct. 19, 2004 (JP) ............................. 2004-304306

(51) Int. Cl.
*G11B 20/00* (2006.01)
(52) U.S. Cl. .................................... 369/47.16
(58) Field of Classification Search ............... 369/2, 369/4, 47.15, 47.16; 386/97, 98, 99
See application file for complete search history.

(56) References Cited

U.S. PATENT DOCUMENTS
2007/0147207 A1* 6/2007 Sako et al. ............... 369/53.31

FOREIGN PATENT DOCUMENTS
JP 11-355326 12/1999
JP 2003-259467 9/2003

OTHER PUBLICATIONS

Paul Miller, Yamaha DVD-S2300 Universal Player, Hi-fi News, V. 48, No. 4, pp. 1-6.*
AV Receiver TX-DS989 catalog (For USA, Onkyo Corporation, catalog No. 2KC05 p. 20).

* cited by examiner

*Primary Examiner*—Wayne R Young
*Assistant Examiner*—Brenda Bernardi
(74) *Attorney, Agent, or Firm*—Renner, Otto, Boisselle & Sklar, LLP

(57) ABSTRACT

Players 2A and 2B are each capable of outputting data read from a disc such as a CD or an SACD in any of signal formats including an IEEE 1394 format, an analog format and a digital format. An AV amplifier 3 includes a first output system for selectively outputting, to a speaker system 4A, one of a plurality of audio signals of different signal formats including the IEEE 1394 format, the analog format and the digital format, and a second output system for selectively outputting, to a speaker system 4B, one of a plurality of audio signals of different signal formats including the analog format and the digital format. If the player 2A is selected as the input for the first output system, the AV amplifier 3 sends a command to the player 2A instructing the player 2A to output an audio signal in the IEEE 1394 format, automatically setting the output signal format of the player 2A to be a format that can be reproduced through the first output system.

18 Claims, 6 Drawing Sheets

AUDIO SYSTEM, AND DISC REPRODUCTION DEVICE AND AUDIO OUTPUT CONTROL DEVICE FOR USE THEREIN

BACKGROUND OF THE INVENTION

1. Field of the Invention

The present invention relates to an audio system including a disc reproduction device, such as a DVD player, capable of sending/receiving an audio signal via an IEEE 1394 interface, and an AV (Audio Video) amplifier for amplifying the audio signal from the disc reproduction device to output the amplified audio signal to a speaker.

2. Description of the Related Art

Audio systems well known in the art include those whose components, i.e., an AV amplifier and a disc reproduction device, are connected together via an IEEE 1394 interface, and those in which two or more speaker systems installed in different rooms are connected to an AV amplifier so that the user can enjoy music in any of these rooms. These audio systems can be found in, for example, Japanese Laid-Open Patent Publication Nos. 11-355326 and 2003-259467.

A player is a sound source-side component of an audio system. A conventional player is capable of reading recorded data (digital audio data) from different types of discs, such as a DVD (Digital Versatile Disc), a CD (Compact Disc) and an SACD (Super Audio CD), and includes a digital output path in which the read digital data is output as it is from a digital output terminal, an analog output path in which the read digital data is converted into an analog signal and output from an analog output terminal, and an IEEE 1394 output path in which the read digital data is converted into data to be transferred in compliance with the IEEE 1394 standard (hereinafter referred to as "IEEE 1394 data"), which is output from an IEEE 1394 interface.

Specifically, a player of this type includes a disc reading section for reading recorded data from a disc, a DSP (Digital Signal Processor) for converting the read data into an analog signal, a DSD decoder for decoding DSD (Direct Stream Digital) audio data read from an SACD, and an IEEE 1394 selector for selecting whether or not to output the read data (decoded data from the DSD decoder in the case of SACD) through the IEEE 1394 interface.

In the digital output path, data read from the disc is output as it is from the digital output terminal. In the analog output path, data read from a non-SACD disc is output from the analog output terminal via the DSP, and data read from an SACD is output from the analog output terminal via the DSD decoder and the IEEE 1394 selector if the IEEE 1394 selector is in such a setting that data is not output from the IEEE 1394 interface. In the IEEE 1394 output path, data read from the disc is output from the IEEE 1394 interface via the DSD decoder and the IEEE 1394 selector if the IEEE 1394 selector is in such a setting that data is output from the IEEE 1394 interface.

The setting of the IEEE 1394 selector can be changed by the user operating a control section. In the "IEEE 1394 ON" setting, data read from the disc is output from the IEEE 1394 interface. In the "IEEE 1394 OFF" setting, data read from the disc is not output from the IEEE 1394 interface.

Table 1 below shows whether an audio signal can be reproduced for each combination of the IEEE 1394 selector setting in the player, the disc type and the type of output terminal. As can be seen from Table 1, where an SACD is loaded in the player, the audio output cannot be obtained unless the subsequent AV amplifier receives digital audio data via the IEEE 1394 interface if the IEEE 1394 selector is in the "IEEE 1394 ON" setting, and audio output cannot be obtained unless the AV amplifier receives an analog signal via the analog input terminal if the IEEE 1394 selector is in the "IEEE 1394 OFF" setting.

TABLE 1

| Output Terminal | IEEE 1394 selector | | | | | |
|---|---|---|---|---|---|---|
| | IEEE 1394 ON | | | IEEE 1394 OFF | | |
| | CD | DVD | SACD | CD | DVD | SACD |
| Analog | playable | playable | unplayable | playable | playable | playable |
| Digital | playable | playable | unplayable | playable | playable | unplayable |
| IEEE 1394 | playable | playable | playable | playable | playable | unplayable |

A speaker is an output-side component of an audio system. A conventional speaker system includes a plurality of speakers of different frequency bands for compatibility with a surround system (e.g., six speakers are included in a typical 5.1-channel surround system).

An AV amplifier is an intermediate component provided between the player and the speaker. A conventional AV amplifier offers a connectability such that a plurality of players as described above and a plurality of speaker systems as described above can be connected to the AV amplifier. Specifically, such an AV amplifier includes a group of input terminals (including a plurality of digital input terminals, a plurality of analog input terminals, and an IEEE 1394 interface), a group of output terminals (including a plurality of sets of multi-channel speaker output terminals), and an audio signal processing section. The audio signal processing section selects a signal path between an input terminal of the group of input terminals and a multi-channel speaker output terminal of the group of output terminals. The audio signal processing section also performs predetermined signal processing operations, such as converting digital audio data into an analog audio signal, and amplifying a signal level.

For example, a conventional AV amplifier includes two sets of multi-channel speaker output terminals, a first audio signal processing section for a first set of multi-channel speaker output terminals, and a second audio signal processing section for a second set of multi-channel speaker output terminals. The first audio signal processing section can selectively output digital audio data or an analog audio signal received from a digital input terminal, an analog input terminal or an IEEE 1394 interface to the first set of multi-channel speaker output terminals (the output system for a signal passing through the first audio signal processing section will hereinafter be referred to as the "first speaker output system"). The second audio signal processing section can selectively output digital audio data or an analog audio signal received from a digital input terminal or an analog input terminal to the second set of multi-channel speaker output terminals (the output system for a signal passing through the second audio signal processing section will hereinafter be referred to as the "second speaker output system").

An AV amplifier of this type includes an IEEE 1394 selector similar to that provided in a player. Moreover, the first audio signal processing section is provided with a first input selector for selecting digital audio data or an analog audio signal from a digital input terminal, an analog input terminal or an IEEE 1394 interface, and the second audio signal processing section includes a second input selector for selecting digital audio data or an analog audio signal from a digital input terminal or an analog input terminal. These input selectors can be switched by the user operating a control section.

For example, where two players as described above are connected as sound sources to such an AV amplifier, the user can control the first and second input selectors so that the audio output from one player is simultaneously output from two speaker systems installed in two different rooms via the first and second speaker output systems, or so that the audio output from one player is output from one speaker system via the first speaker output system while the audio output from the other player is output from the other speaker system via the second speaker output system.

In the audio system described above including two players, an AV amplifier and two speaker systems, the first speaker output system receives digital audio data input from the IEEE 1394 interface, but the second speaker output system does not receive digital audio data input from the IEEE 1394 interface. Thus, the digital audio data cannot be reproduced through the second speaker output system. For example, where reproduced sound signals from different players are output from different speaker systems, the following problem arises. If the IEEE 1394 selector of the player being the sound source for the second speaker output system is set to "IEEE 1394 ON" and if an SACD is loaded in the player, a sound signal reproduced from the SACD cannot be output from the speaker system via the second speaker output system, as shown in Table 2 below.

TABLE 2

| Input type | First speaker output system | Second speaker output system |
| --- | --- | --- |
| Analog | playable | playable |
| Digital | playable | playable |
| IEEE 1394 | playable | unplayable |

Similarly, where a sound signal reproduced from the same player is output from the two speaker systems, if the IEEE 1394 selector of the player being the sound source for the first and second speaker output systems is set to "IEEE 1394 ON" and if an SACD is loaded in the player, the reproduced sound signal cannot be output from the speaker system connected to the second speaker output system.

FIG. 4 is a block diagram showing a basic configuration of an audio system for illustrating this problem in a generalized form.

With the configuration shown in FIG. 4, two players 500A and 500B can simultaneously output audio signals each in any of three different signal formats. However, for a special type of a disc such as an SACD, only a signal format A or B can be selected by a selector 501. An AV amplifier 600 includes a first audio output processing section 601 and a second audio output processing section 603. The first audio output processing section 601 can output, to a first speaker system 701, an audio signal selected by a first input selector 602 from among audio signals of three signals formats A, B and C received from each of the players 500A and 500B. The second audio output processing section 603 can output, to a second speaker system 702, an audio signal selected by a second input selector 604 from among audio signals of two signal formats B and C received from each of the players 500A and 500B.

The first audio output processing section 601 of the AV amplifier 600 is connected only to the first speaker system 701, and the second audio output processing section 603 thereof is connected only to the second speaker system 702. Thus, the first input selector 602 selects the sound source for the first speaker system 701, and the second input selector 604 selects the sound source for the second speaker system 702.

The first input selector 602 receives a total of six audio signals, i.e., audio signals A1, B1 and C1 from output terminals 502, 503 and 504 of the player 500A and audio signals A2, B2 and C2 from output terminals 502, 503 and 504 of the player 500B. The second input selector 604 receives a total of four audio signals, i.e., audio signals B1 and C1 from the output terminals 503 and 504 of the player 500A and audio signals B2 and C2 from the output terminals 503 and 504 of the player 500B. Therefore, unless a special type of a disc is loaded in the player 500A or 500B, the player 500A can be selected as the sound source for the first speaker system 701 while selecting the player 500B as the sound source for the second speaker system 702, and vice versa.

However, if a special type of a disc is loaded in either or both of the players 500A and 500B, the user may not be able to select a particular combination or particular combinations between the players 500A and 500B and the first and second speaker systems 701 and 702.

For example, where a special type of a disc is loaded only in the player 500A, if the selector 501 of the player 500A is set to the signal format B and if the first input selector 602 of the AV amplifier 600 selects the audio signal A1, as shown in FIG. 5, an audio signal from the player 500A cannot be output from the first speaker system 701.

Where discs of a special type are loaded in the players 500A and 500B, if the selectors 501 of the players 500A and 500B are both set to the signal format A and if the first input selector 602 of the AV amplifier 600 selects the audio signal A1 while the second input selector 604 selects the audio signal B2, as shown in FIG. 6, an audio signal from the player 500A can be output from the first speaker system 701 but an audio signal from the player 500B cannot be output from the second speaker system 702.

The first input selector 602 and the second input selector 604 of the AV amplifier 600 are used by the user selecting the sound sources to be reproduced through the first speaker system 701 and the second speaker system 702, respectively. Therefore, it is preferred that the first input selector 602 (or the second input selector 604) receives a type of an audio signal intended by the user according to the setting of the selector. However, in cases shown in FIG. 5 and FIG. 6, the type of an audio signal intended by the user is not provided from a player, and the user needs to change the setting of the selector 501 of the player 500A or 500B to the intended signal format.

Specifically, in the case of FIG. 5, the user needs to change the setting of the selector 501 so that the audio signal A1 is output from the player 500A, and in the case of FIG. 6, the user needs to change the setting of the selector 501 so that the audio signal B2 is output from the player 500B.

With an audio system using an AV amplifier as described above, each time the user places a disc in the player 500A or 500B, the user needs to select the output audio signal format of the player 500A or 500B so that it matches with the input audio signal format required by the first or second audio output processing section 601 or 603 of the AV amplifier 600 corresponding to the player 500A or 500B. This can be tiresome for the user.

This problem can be avoided if the first audio output processing section 601 and the second audio output processing section 603 of the AV amplifier 600 have the same configuration, and the AV amplifier 600 can select any of a total of six audio signal formats from the players 500A and 500B for each of the first and second audio output processing sections 601 and 603. However, it is typical for a user to have main and sub-speaker output systems to keep the AV amplifier 600 simple and inexpensive while obtaining a high functionality, e.g., by using the first audio output processing section 601 and the first input selector 602 as the main speaker output system and the second audio output processing section 603 and the second input selector 604 as the sub-speaker output system. Then, the problem above is inevitable.

SUMMARY OF THE INVENTION

It is therefore an object of the present invention to provide an audio system in which a sound signal reproduced from a disc placed in a player can be reliably output from a speaker system while the user does not have to adjust the output system for the disc according to the type of the disc, and to provide a disc reproduction device and an audio output control device for use in such an audio system.

An audio system in a preferred embodiment of the present invention includes a disc reproduction device and an audio output control device. The disc reproduction device includes a disc reading section for reading audio data recorded on a disc, a first signal output section for outputting the audio data in a first signal format, a second signal output section for outputting the audio data in a second signal format different from the first signal format, an output selection section for selecting whether the audio data read by the disc reading section is output in the first or second signal format, and an output selection controller for controlling the selection operation by the output selection section. The audio output control device includes a first signal input section for receiving audio data of the first signal format, a second signal input section for receiving audio data of the second signal format, an audio output processing section for reproducing and outputting the audio data of the first signal format or the second signal format to a sound generator, an input selection section for selecting one of a plurality of audio data received from the first and second signal input sections and inputting the selected audio data to the audio output processing section, and an input selection controller for controlling the selection operation by the input selection section. The disc reproduction device further includes a determination section for determining whether or not data can be exchanged between the first signal output section and the first signal input section. The output selection controller controls the selection operation by the output selection section so that audio data read by the disc reading section is output in the first signal format if audio data can be exchanged between the first signal output section and the first signal input section, whereas audio data read by the disc reading section is output in the second signal format if audio data cannot be exchanged between the first signal output section and the first signal input section.

Thus, if audio data can be exchanged between the first signal output section of the disc reproduction device and the first signal input section of the audio output control device, the output audio data format of the disc reproduction device is set so that the audio data is output in the first signal format. If audio data cannot be exchanged between the first signal output section of the disc reproduction device and the first signal input section of the audio output control device, the output audio data format audio data of the disc reproduction device is set so that the audio data is output in the second signal format. Therefore, the audio data from the disc reproduction device can reliably be reproduced by the first audio output processing section of the audio output control device and output from the first sound generator without the user manually adjusting the signal format of the audio data output from the disc reproduction device.

Preferably, the first signal format is a signal format in compliance with IEEE 1349, and the second signal format is an analog audio signal format.

An audio system in another preferred embodiment of the present invention includes a plurality of disc reproduction devices and an audio output control device. The disc reproduction devices each include a disc reading section for reading audio data recorded on a disc, a first signal output section for outputting the audio data in a first signal format, a second signal output section for outputting the audio data in a second signal format different from the first signal format, an output selection section for selecting whether the audio data read by the disc reading section is output in the first or second signal format, and an output selection controller for controlling the selection operation by the output selection section. The audio output control device includes a first signal input section for receiving a plurality of audio data of the first signal format including the audio data output from the first signal output section, a second signal input section for receiving a plurality of audio data of the second signal format including the audio data output from the second signal output section, a first audio output processing section for outputting audio data of the first signal format or the second signal format to a first sound generator, a first input selection section for selecting one of a plurality of audio data received from the first and second signal input sections and inputting the selected audio data to the first audio output processing section, and an input selection controller for controlling the selection operation by the first input selection section. The audio output control device includes a determination section for determining whether or not the audio data output from the first signal output section of the disc reproduction device is being selected among the audio data input from the first signal input section via the first input selection section, and a command sending section for sending, to the output selection controller of the disc reproduction device, a command instructing the output selection controller of the disc reproduction device to output the audio data read by the disc reading section in the first signal format if it is determined by the determination section that the audio data output from the first signal output section of the disc reproduction device is being selected, and sending, to the output selection controller of the disc reproduction device, a command instructing the output selection controller of the disc reproduction device to output the audio data read by the disc reading section in the second signal format if it is determined by the determination section that the audio data output from the first signal output section of the disc reproduction device is not being selected. The output selection controller of the disc reproduction device controls the selection operation by the output selection section based on the command sent from the command sending section.

Thus, the audio output control device sends a command instructing the disc reproduction device selected as the sound source for the first audio output processing section to output the audio data in the first signal format, changing the signal format of the audio data output from the disc reproduction device to a format that can be processed by the first audio output processing section. Therefore, the audio data from the disc reproduction device can reliably be reproduced by the first audio output processing section of the audio output control device and output from the first sound generator without the user manually adjusting the signal format of the audio data output from the disc reproduction device.

Preferably, the audio output control device further includes a second audio output processing section for reproducing and outputting the audio data of the second signal format to a second sound generator, a second input selection section for selecting one of a plurality of audio data received from the second signal input section and inputting the selected audio data to the second audio output processing section, a second determination section for determining whether or not the audio data output from the disc reproduction device is being selected among the audio data input from the second signal input section via the second input selection section, and a second command sending section for sending, to the output selection controller of the disc reproduction device, a command instructing the output selection controller of the disc reproduction device to output the audio data read by the disc reading section in the second signal format if it is determined by the second determination section that the audio data output from the disc reproduction device is being selected. The output selection controller of the disc reproduction device controls the selection operation by the output selection section based also on the command sent from the second command sending section.

Thus, the audio output control device sends a command instructing the disc reproduction device selected as the sound source for the second audio output processing section to output the audio data in the second signal format, changing the signal format of the audio data output from the disc reproduction device to a format that can be processed by the second audio output processing section. Therefore, the audio data from the disc reproduction device can reliably be reproduced by the second audio output processing section of the audio output control device and output from the second sound generator without the user manually adjusting the signal format of the audio data output from the disc reproduction device.

Preferably, the first signal format is a signal format in compliance with IEEE 1349, and the second signal format is an analog audio signal format.

DETAILED DESCRIPTION OF THE PREFERRED EMBODIMENTS

Figure 1:
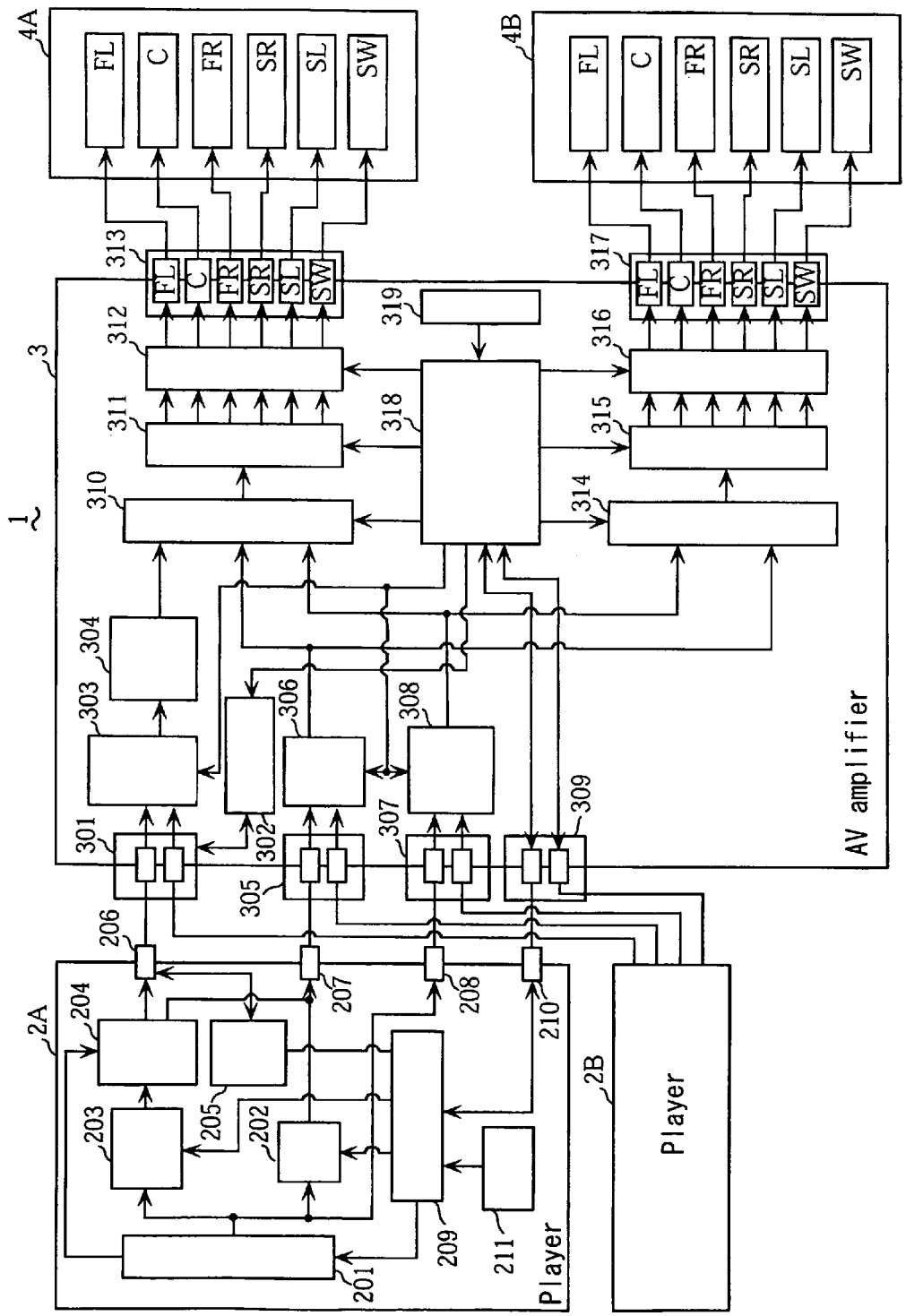
FIG. 1 is a block diagram showing an important part of an audio system according to one embodiment of the present invention.

An audio system of the present invention will now be described with reference to the drawings. FIG. 1 is a block diagram showing an important part of an audio system 1 according to one embodiment of the present invention.

Referring to FIG. 1, the audio system 1 includes two DVD players 2A and 2B (disc reproduction devices), one AV amplifier 3 (audio output control device), and two multi-channel speaker systems 4A and 4B compatible with a surround system. The DVD players 2A and 2B have the same internal configuration. The speaker systems 4A and 4B have the same configuration, but are installed in different rooms. For example, the speaker system 4A may be in a living room, while the speaker system 4B is in different room, e.g., a study.

Each of the speaker systems 4A and 4B is a 5.1-channel speaker system including a total of six speakers: a front left channel speaker (FL), a center channel speaker (C), a front right channel speaker (FR), a surround right channel speaker (SR), a surround left channel speaker (SL), and a surround subwoofer speaker (SW).

The following description of a DVD player is directed to the DVD player 2A. The DVD player 2B has the same internal configuration as that of the DVD player 2A. The DVD player 2A is a universal player capable of reading recorded audio data (digital audio data) not only from a DVD but also from other types of discs, such as a CD or an SACD. While a DVD also contains video data, the following description only discusses the audio data contained therein, as the present invention is directed to the reproduction of audio data.

The DVD player 2A includes a disc reading section 201, a DSP 202, a DSD decoder 203, an IEEE 1394 output selector 204, a communication controller 205 (hereinafter referred to as an "IEEE 1394 microcomputer 205"), an IEEE 1394 interface 206, an analog output terminal 207, a digital output terminal 208, a controller 209 (hereinafter referred to as a "DVD system microcomputer 209"), a control terminal 210, and a control section 211.

The IEEE 1394 interface 206 is connected to an IEEE 1394 interface 301 of the AV amplifier 3 via a predetermined IEEE 1394 cable. The analog output terminal 207 is connected to an analog input terminal 305 of the AV amplifier 3 via an electric signal line such as a coaxial line, and the digital output terminal 208 is connected to a digital input terminal 307 of the AV amplifier 3 via an optical line or an electric signal line such as a coaxial line. The control terminal 210 is connected to a control terminal 309 of the AV amplifier 3 via an electric signal line such as a coaxial line.

The disc reading section 201 reads recorded data from a disc. The disc reading section 201 includes a disc loading mechanism, a disc drive mechanism for spinning a loaded disc at a predetermined speed, an optical mechanism for irradiating the recording surface of a spinning disc with laser light to read audio data (digital data) from the reflected light, and a controller for controlling the operation of the mechanical and optical mechanisms. The disc reading operation of the disc reading section 201 is controlled by the DVD system microcomputer 209.

When the user gives a "PLAY DISC" instruction using the control section 211, the DVD system microcomputer 209 outputs a control signal instructing the controller of the disc reading section 201 to read data from the disc. In response to the control signal, the controller controls the operation of the mechanical and optical mechanisms to read audio data from the loaded disc. Data read by the disc reading section 201 is input to the DSP 202 and the DSD decoder 203, and is input from the digital output terminal 208 to the AV amplifier 3 via a signal line such as an optical line or a coaxial line.

The DSP 202 decodes the data (digital audio data) read from the disc by the disc reading section 201 into an analog audio signal. Where the audio data recorded on the disc, e.g., a DVD or a CD, is 5.1-channel surround audio data, the DSP 202 decodes the audio data into six analog audio signals having different frequency characteristics for different channels. The analog audio signal from the DSP 202 is input from the analog output terminal 207 to the AV amplifier 3 via a signal line such as a coaxial line.

The DSD decoder 203 decodes DSD audio data into an analog audio signal. In the present embodiment, among various digital audio data from the disc reading section 201, only those from SACDs are DSD data. Therefore, the DSD decoder 203 is substantially a dedicated decoder for data read from SACDs.

Although the DSD decoder 203 also receives data read from a DVD or CD, which is non-DSD audio data, the DSD decoder 203 does not decode such received data but performs a pass-through operation of outputting a received input signal intact when the disc is a DVD or CD. Specifically, the DVD system microcomputer 209 controls the operation of the DSD decoder 203 so that the DSD decoder 203 decodes the received data if the disc from which data is read by the disc reading section 201 is an SACD while the DSD decoder 203 performs the pass-through operation if the disc is not an SACD. Data output from the DSD decoder 203 is input to the IEEE 1394 output selector 204.

The IEEE 1394 output selector 204 selectively outputs the analog audio signal from the DSD decoder 203 to the IEEE 1394 interface 206 or the analog output terminal 207. In the "IEEE 1394 ON" setting, the IEEE 1394 output selector 204 converts the analog audio signal from the DSD decoder 203 into data to be transferred in compliance with the IEEE 1394 standard (hereinafter referred to as "IEEE 1394 data") and outputs the IEEE 1394 data to the IEEE 1394 interface 206. In the "IEEE 1394 OFF" setting, the IEEE 1394 output selector 204 passes the analog audio signal from the DSD decoder 203 to the analog output terminal 207.

The setting of the IEEE 1394 output selector 204 can be selected by the user operating the control section 211. When the user operates the control section 211 to give an instruction to set the IEEE 1394 output selector 204 to "IEEE 1394 ON", the instruction is passed from the DVD system microcomputer 209 to the disc reading section 201, and the controller of the disc reading section 201 sets the IEEE 1394 output selector 204 to "IEEE 1394 ON". Similarly, when the user operates the control section 211 to give an instruction to set the IEEE 1394 output selector 204 to "IEEE 1394 OFF", the instruction is passed from the DVD system microcomputer 209 to the disc reading section 201, and the controller of the disc reading section 201 sets the IEEE 1394 output selector 204 to "IEEE 1394 OFF".

When the IEEE 1394 output selector 204 is in the "IEEE 1394 ON" setting, the IEEE 1394 output selector 204 outputs IEEE 1394 data, and the IEEE 1394 data is input to the AV amplifier 3 via the IEEE 1394 interface 206.

When the IEEE 1394 output selector 204 is in the "IEEE 1394 OFF" setting, the IEEE 1394 output selector 204 outputs the received digital audio data or analog audio signal (decoded by the DSD decoder 203) as it is, and the digital audio data or analog audio signal is input to the AV amplifier 3 via the analog output terminal 207.

Where the disc is an SACD, if the IEEE 1394 output selector 204 is in the "IEEE 1394 ON" setting, data read from the SACD is input to the AV amplifier 3 as IEEE 1394 data via the DSD decoder 203, the IEEE 1394 output selector 204 and the IEEE 1394 interface 206. Then, in the AV amplifier 3, where DSD data cannot be decoded, a signal received via the analog output terminal 207 or data received via the digital output terminal 208 cannot be output from the speaker system 4A or 4B, and only the IEEE 1394 data is output from the speaker system 4A or 4B.

If the IEEE 1394 output selector 204 is in the "IEEE 1394 OFF" setting, data read from an SACD is input to the AV amplifier 3 as an analog audio signal via the DSD decoder 203, the IEEE 1394 output selector 204 and the analog output terminal 207. Then, in the AV amplifier 3, data received via the IEEE 1394 interface 206 or the digital output terminal 208 is not output from the speaker system 4A or 4B, and only an analog audio signal is output from the speaker system 4A or 4B.

Where the disc is a DVD or CD, if the IEEE 1394 output selector 204 is in the "IEEE 1394 ON" setting, data read from the DVD or CD is input to the AV amplifier 3 as IEEE 1394 data via the DSD decoder 203, the IEEE 1394 output selector 204 and the IEEE 1394 interface 206, and is also input to the AV amplifier 3 via the DSP 202 and the analog output terminal 207 and to the AV amplifier 3 via the digital output terminal 208. Then, in the AV amplifier 3, data received via the IEEE 1394 interface 206 and the digital output terminal 208 and the signal received via the analog output terminal 207 can all be output from the speaker system 4A or 4B. Therefore, two audio input signals selected from among the three audio input signals are output from the speaker system 4A or 4B.

If the IEEE 1394 output selector 204 is in the "IEEE 1394 OFF" setting, data read from a DVD or CD is input to the AV amplifier 3 via the DSP 202 and the analog output terminal 207, and is also input to the AV amplifier 3 via the digital output terminal 208. Then, in the AV amplifier 3, two audio input signals are output from the speaker systems 4A and 4B.

The IEEE 1394 interface 206 is an interface for externally outputting digital audio data in a data transfer scheme based on the IEEE 1394 standard.

The IEEE 1394 microcomputer 205 is a microcomputer for controlling the exchange of data based on the IEEE 1394 standard between the IEEE 1394 microcomputer 205 and an IEEE 1394 microcomputer 302 of the AV amplifier 3. Operations performed by the IEEE 1394 microcomputer 205 include checking the physical connection of the IEEE 1394 interface 206, authentication for the exchange of data between the IEEE 1394 microcomputer 205 and the IEEE 1394 microcomputer 302 of the AV amplifier 3, and controlling the flow rate at which data is exchanged. The control operation performed by the IEEE 1394 microcomputer 205 for the exchange of IEEE 1394 data is controlled by the DVD system microcomputer 209.

Specifically, when IEEE 1394 data is output via the IEEE 1394 interface 206 of the DVD player 2A, the DVD system microcomputer 209 gives an instruction for the IEEE 1394 microcomputer 205 to check the physical connection of the IEEE 1394 interface 206 or an instruction for the IEEE 1394 microcomputer 205 to given an authentication enabling the exchange of data. Based on these instructions, the IEEE 1394 microcomputer 205 checks the physical connection of the IEEE 1394 interface 206 or performs an authentication process to enable the exchange of data. Then, when the DVD system microcomputer 209 gives an instruction for the IEEE 1394 microcomputer 205 to output IEEE 1394 data, the IEEE 1394 microcomputer 205 outputs IEEE 1394 data via the IEEE 1394 interface 206. In this process, the IEEE 1394 microcomputer 205 communicates with the IEEE 1394 microcomputer 302 of the AV amplifier 3 and controls the output rate of the IEEE 1394 data.

The digital output terminal 208 is an output terminal via which digital audio data is output. The analog output terminal 207 is an output terminal via which an analog audio signal is output.

The DVD system microcomputer 209 is a microcomputer responsible for an overall control of the operation of the DVD player 2A. The DVD system microcomputer 209 controls the operation of the disc reading section 201, the DSP 202, the DSD decoder 203 and the IEEE 1394 microcomputer 205 based on the control information from the control section 211 to control a series of reproduction operations of reading the recorded audio data from a disc loaded in the disc reading section 201 and outputting the read data or data obtained by decoding the read data to the AV amplifier 3.

The DVD system microcomputer 209 exchanges various information with an AV system microcomputer 318 of the AV amplifier 3 so that the operation status and the operation condition of the DVD player 2A are linked with those of the AV amplifier 3. For example, where the loaded disc is an SACD and the output data format is not a format that can be reproduced by the AV amplifier 3, the output format of the DVD player 2A is changed to a format that can be reproduced by the AV amplifier 3.

Specifically, where the loaded disc is an SACD and the IEEE 1394 input selector 204 is in the "IEEE 1394 ON" setting, if the signal format that can be reproduced by the AV amplifier 3 is the analog audio signal format, the DVD system microcomputer 209 switches the setting of the IEEE 1394 input selector 204 to "IEEE 1394 OFF" via the disc reading section 201. Where the IEEE 1394 input selector 204 is in the "IEEE 1394 OFF" setting, if the signal format that can be reproduced by the AV amplifier 3 is the IEEE 1394 format, the DVD system microcomputer 209 switches the setting of the IEEE 1394 input selector 204 to "IEEE 1394 ON". The process of changing the output format of the DVD player 2A will later be described in detail.

The control terminal 210 is a terminal via which control signals are exchanged between the DVD system microcomputer 209 and the AV system microcomputer 318 of the AV amplifier 3 to be described later.

The control section 211 includes elements such as a plurality of push buttons on the DVD player 2A and a remote controller. The user can input various conditions for the disc reproduction by operating the control section 211. For example, the user can operate the control section 211 to desirably specify the volume, the sound quality, a tune or tunes to play, the order in which tunes are played, the settings of the IEEE 1394 input selector 204, etc.

The AV amplifier 3 includes the IEEE 1394 interface 301, the communication controller 302 (hereinafter referred to as the "IEEE 1394 microcomputer 302"), an IEEE 1394 input selector 303, an IEEE 1394 decoder 304, the analog input terminal 305, an analog input selector 306, the digital input terminal 307, a digital input selector 308, the control terminal 309, a first input selector 310, a first DSP 311, a first amplifier 312, a first speaker output terminal 313, a second input selector 314, a second DSP 315, a second amplifier 316, a second speaker output terminal 317, the controller 318 (hereinafter referred to as the "AV system microcomputer 318"), and a control section 319.

The IEEE 1394 interface 301, the analog input terminal 305, the digital input terminal 307 and the control terminal 309 each include two terminal portions, one of which is connected to the corresponding one of the IEEE 1394 interface 206, the analog output terminal 207, the digital output terminal 208 and the control terminal 210 of the DVD player 2A via a predetermined cable as mentioned above, with the other one being connected to the corresponding one of the IEEE 1394 interface 206, the analog output terminal 207, the digital output terminal 208 and the control terminal 210 of the DVD player 2B via a predetermined cable as mentioned above.

The AV amplifier 3 includes two speaker output systems for independently outputting received audio signals, which may be the same signal or different signals, to the speaker systems 4A and 4B. The first input selector 310, the first DSP 311, the first amplifier 312 and the first speaker output terminal 313 together form the first speaker output system, and the second input selector 314, the second DSP 315, the second amplifier 316 and the second speaker output terminal 317 together form the second speaker output system. The IEEE 1394 interface 301, the IEEE 1394 microcomputer 302, the IEEE 1394 input selector 303, the IEEE 1394 decoder 304, the analog input terminal 305, the analog input selector 306, the digital input terminal 307 and the digital input selector 308 together form a preceding circuit for passing the received audio signals to the first and second speaker output systems.

The IEEE 1394 interface 301 and the IEEE 1394 microcomputer 302 are equal in function to the IEEE 1394 interface 206 and the IEEE 1394 microcomputer 205 of the DVD player 2A. The control of the exchange of IEEE 1394 data by the IEEE 1394 microcomputer 302 is controlled by the AV system microcomputer 318.

The IEEE 1394 input selector 303 selectively passes, to the IEEE 1394 decoder 304, IEEE 1394 data from one of the two terminal portions of the IEEE 1394 interface 301. The setting of the IEEE 1394 input selector 303 can be selected by the user operating the control section 319.

Although not shown in the figure, each terminal portion of the IEEE 1394 interface 301 is assigned a port number. When the user specifies a port number of one of the terminal portions of the IEEE 1394 interface 301 by using the control section 319, the AV system microcomputer 318 sets the port number in the IEEE 1394 input selector 303. Thus, the IEEE 1394 input selector 303 passes, to the IEEE 1394 decoder 304, the IEEE 1394 data received via a terminal portion of the IEEE 1394 interface 301 of the specified port number. Referring to FIG. 1, if the port number of the upper terminal portion of the IEEE 1394 interface 301 is specified, the IEEE 1394 decoder 304 receives IEEE 1394 data that is input from the DVD player 2A via the IEEE 1394 interface 206 and the IEEE 1394 interface 301.

The IEEE 1394 decoder 304 decodes the received IEEE 1394 data into original digital audio data. The decoded digital audio data is input to the first input selector 310.

The analog input selector 306 selectively outputs one of the analog audio signals received via the two terminal portions of the analog input terminal 305. The digital input selector 308 selectively outputs one of the digital audio data received via the two terminal portions of the digital input terminal 307.

The setting of the analog input selector 306 and that of the digital input selector 308 can also be selected by the user operating the control section 319. Although not shown in the figure, the terminal portions of the analog input selector 306 and the digital input selector 308 are each assigned a port number. When the user specifies a port number of one of the terminal portions of the analog input selector 306 (or the digital input selector 308) by using the control section 319, the AV system microcomputer 318 sets the port number in the analog input selector 306 (or the digital input selector 308). Thus, the analog input selector 306 (or the digital input selector 308) outputs the analog audio signal (or the digital audio data) received via a terminal portion of the analog input terminal 305 (or the digital input terminal 307) of the specified port number.

Referring to FIG. 1, if the port number of the upper terminal portion of the analog input selector 306 is specified, the analog input selector 306 outputs an analog audio signal that is received from the DVD player 2A via the analog output terminal 207 and the analog input terminal 305. The analog audio signal output from the analog input selector 306 is input to the first input selector 310 and the second input selector 314. Thus, the analog audio signal output from the DVD player 2A via the analog output terminal 207 is input to the first input selector 310 and the second input selector 314.

If the port number of the upper terminal portion of the digital input selector 308 is specified, the digital input selector 308 outputs the digital audio data received from the DVD player 2A via the digital output terminal 208 and the digital input terminal 307. The digital audio data output from the digital input selector 308 is input to the first input selector 310 and the second input selector 314. Thus, the digital audio data output from the DVD player 2A via the digital output terminal 208 is input to the first input selector 310 and the second input selector 314.

The first input selector 310 selectively outputs, to the first DSP 311, one of the digital audio data received from the IEEE 1394 decoder 304, the analog audio signal from the analog input selector 306, and the digital audio data from the digital input selector 308.

The setting of the first input selector 310 can also be selected by the user operating the control section 319. When the user operates the control section 319 to select the "IEEE 1394 IN" setting (the input from the IEEE 1394 interface 301), the "ANALOG IN" setting (the input from the analog input terminal 305) or the "DIGITAL IN" setting (the input from the digital input terminal 307) for the first speaker output system, the AV system microcomputer 318 registers the setting in the first input selector 310.

For example, the digital audio data received from the IEEE 1394 decoder 304 is output from the first input selector 310 in the "IEEE 1394 IN" setting, the analog audio signal received from the analog input terminal 305 is output from the first input selector 310 in the "ANALOG IN" setting, and the digital audio data received from the digital input terminal 307 is output from the first input selector 310 in the "DIGITAL IN" setting.

The first DSP 311 is equal in function to the DSP 202 of the DVD player 2A. Thus, the digital audio data received from the digital input terminal 307 is decoded into an analog audio signal. The decoding operation of the first DSP 311 is controlled by the AV system microcomputer 318. Specifically, when the first input selector 310 is set to "DIGITAL IN", the AV system microcomputer 318 sets the first DSP 311 to "DECODE ON", whereby the first DSP 311 performs a decoding operation. When the first input selector 310 is set to "IEEE 1394 IN" or "ANALOG IN", the AV system microcomputer 318 sets the first DSP 311 to "DECODE OFF", thereby prohibiting a decoding operation. Then, the first DSP 311 outputs the received signal as it is.

Where the received digital audio data is 5.1-channel surround audio data, the received digital audio data is decoded into six analog audio signals having different frequency characteristics for different channels. The decoded analog audio signal from the first DSP 311 is input to the first amplifier 312.

The first amplifier 312 amplifies the analog audio signal from the first DSP 311 to a predetermined level. The first amplifier 312 includes six amplifiers therein, and is compatible with the 5.1-channel surround system. The degree of amplification to be given by the first amplifier 312 is adjusted according to the volume controlled by the user operating the control section 319. Specifically, when the user sets the volume for the first speaker output system by using the control section 319, the volume setting value is input from the AV system microcomputer 318 to the first amplifier 312, and the degree of amplification for each channel of the first amplifier 312 is determined based on the volume setting value.

The analog audio signal from the first amplifier 312 is output to the first speaker system 4A via the first speaker output terminal 313. More specifically, analog audio signals for the FL, C, FR, SL, SR and SW channels are output from the first amplifier 312 to the first speaker system 4A via the FL, C, FR, SL, SR and SW output terminal portions of the first speaker output terminal 313, respectively. Then, the analog audio signals are output from the corresponding speakers FL, C, FR, SL, SR and SW of the first speaker system 4A.

The second input selector 314 selectively outputs, to the second DSP 315, one of the analog audio signal received from the analog input selector 306 and the digital audio data from the digital input selector 308.

The setting of the second input selector 314 can also be selected by the user operating the control section 319. When the user operates the control section 319 to select the "ANALOG IN" setting (the input from the analog input terminal 305) or the "DIGITAL IN" setting (the input from the digital input terminal 307) for the second speaker output system, the AV system microcomputer 318 registers the setting in the second input selector 314.

For example, the analog audio signal received from the analog input terminal 305 is output from the second input selector 314 in the "ANALOG IN" setting, and the digital audio data received from the digital input terminal 307 is output from the second input selector 314 in the "DIGITAL IN" setting.

The second DSP 315 is equal in function to the first DSP 311. Thus, the digital audio data received from the digital input terminal 307 is decoded into an analog audio signal. The decoding operation of the second DSP 315 is also controlled by the AV system microcomputer 318. Specifically, when the second input selector 314 is set to "DIGITAL IN", the AV system microcomputer 318 sets the second DSP 315 to "DECODE ON", whereby the second DSP 315 performs a decoding operation. When the second input selector 314 is set to "ANALOG IN", the AV system microcomputer 318 sets the second DSP 315 to "DECODE OFF", thereby prohibiting a decoding operation. Then, the second DSP 315 outputs the received signal as it is.

Where the received digital audio data is 5.1-channel surround audio data, the second DSP 315 decodes the received digital audio data into analog audio signals having different frequency characteristics for different channels, as does the first DSP 311, and the obtained analog audio signals are input to the second amplifier 316.

The second amplifier 316 amplifies the analog audio signal from the second DSP 315 to a predetermined level. The second amplifier 316 also includes six amplifiers therein, and is compatible with the 5.1-channel surround system. As with the first amplifier 312, the degree of amplification to be given by the second amplifier 316 is also adjusted according to the volume controlled by the user operating the control section 319. Specifically, when the user sets the volume for the second speaker output system by using the control section 319, the volume setting value is input from the AV system microcomputer 318 to the second amplifier 316, and the degree of amplification for each channel of the second amplifier 316 is determined based on the volume setting value.

The analog audio signal from the second amplifier 316 is output to the second speaker system 4B via the second speaker output terminal 317. More specifically, analog audio signals for the FL, C, FR, SL, SR and SW channels are output from the second amplifier 316 to the second speaker system 4B via the FL, C, FR, SL, SR and SW output terminal portions of the second speaker output terminal 317, respectively. Then, the analog audio signals are output from the corresponding speakers FL, C, FR, SL, SR and SW of the second speaker system 4B.

The AV system microcomputer 318 is a microcomputer responsible for an overall control of the operation of the AV amplifier 3. The AV system microcomputer 318 controls the IEEE 1394 input selector 303, the analog input selector 306, the digital input selector 308, the first and second input selectors 310 and 314, the first and second DSPs 311 and 315 and the first and second amplifiers 312 and 316 based on the control information from the control section 319 to control a series of reproduction operations of passing the digital audio data or the analog audio signal received from the IEEE 1394 interface 301, the analog input terminal 305 and the digital input terminal 307 to the speaker systems 4A and 4B through the first and second speaker output systems.

The AV system microcomputer 318 exchanges various information with the DVD system microcomputer 209 of the DVD player 2A so that the operation status and the operation condition of the AV amplifier 3 are linked with those of the DVD player 2A. For example, where the disc loaded in the DVD player 2A is an SACD and the output data format is not a format that can be reproduced by the AV amplifier 3, the output format of the DVD player 2A is changed to a format that can be reproduced by the AV amplifier 3.

Specifically, where the loaded disc is an SACD and the IEEE 1394 input selector 204 is in the "IEEE 1394 ON" setting, if the signal format that can be reproduced by the AV amplifier 3 is the analog audio signal format, the AV system microcomputer 318 sends an "IEEE 1394 OFF" command to the DVD system microcomputer 209, thereby switching the setting of the IEEE 1394 input selector 204 of the DVD player 2A to "IEEE 1394 OFF".

Where the IEEE 1394 input selector 204 is in the "IEEE 1394 OFF" setting, if the signal format that can be reproduced by the AV amplifier 3 is the IEEE 1394 format, the AV system microcomputer 318 sends an "IEEE 1394 ON" command to the DVD system microcomputer 209, thereby switching the setting of the IEEE 1394 input selector 204 of the DVD player 2A to "IEEE 1394 ON".

The control terminal 309 is a terminal via which control signals are exchanged between the AV system microcomputer 318 and the DVD system microcomputer 209 of the DVD player 2A.

The control section 319 includes elements such as a plurality of push buttons on the AV amplifier 3 and a remote controller. The user can input various conditions for the reproduction of received audio signals by operating the control section 319. For example, the user can operate the control section 319 to desirably specify the volume, the sound quality, the settings about the input to the first and second speaker output systems, the settings of the IEEE 1394 input selector 204, etc.

The switching of the IEEE 1394 output selector 204 of the DVD player 2A in the audio system of the present invention will now be described.

Figure 2:
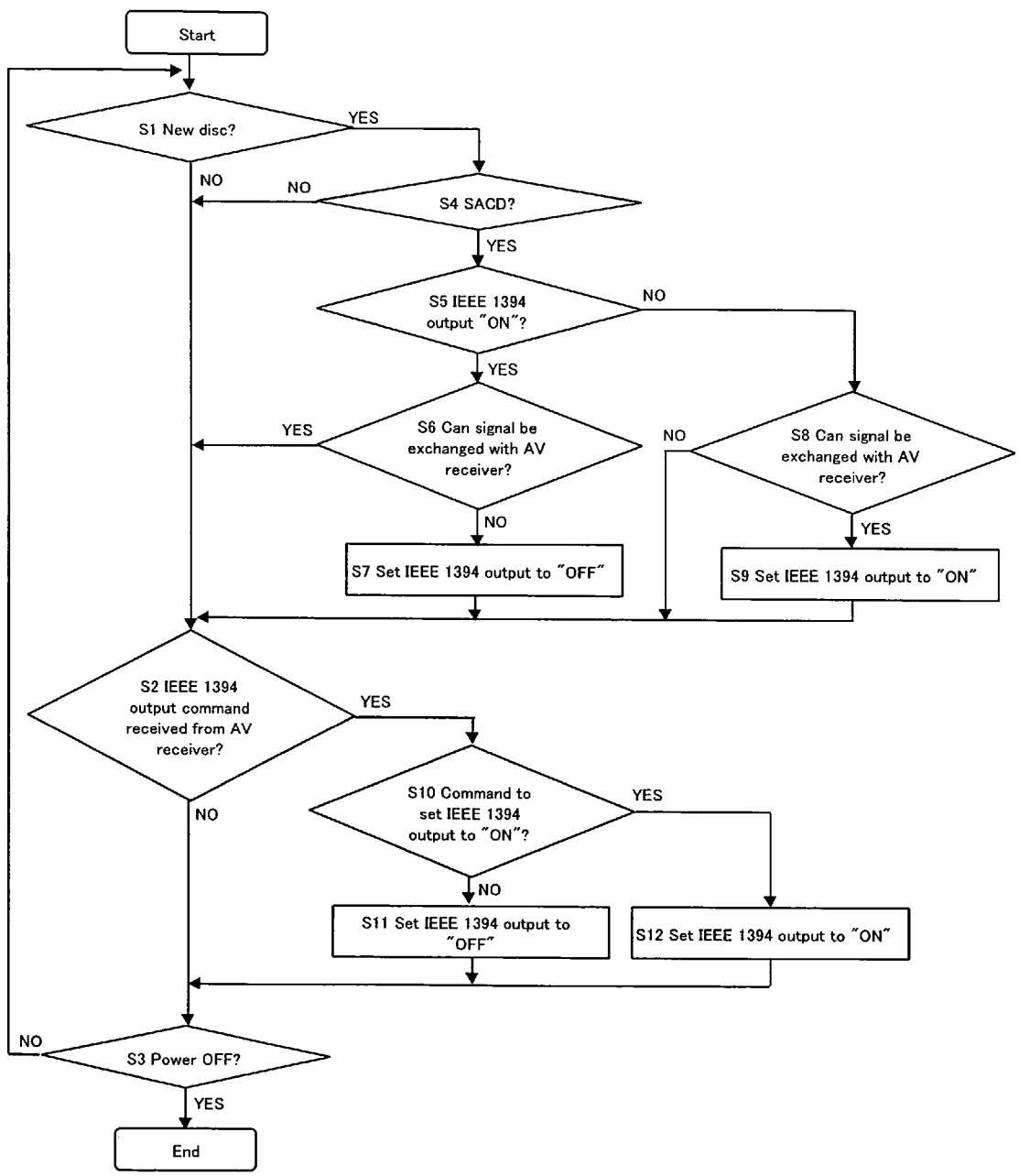
FIG. 2 is a flow chart showing a process relating to the switching of an IEEE 1394 selector in a DVD player.

FIG. 2 is a flow chart showing a process relating to the switching of the IEEE 1394 output selector 204 in the DVD player 2A.

While the power of the DVD player 2A is ON, the process loops through steps S1 to S3, determining on each iteration whether a disc has been newly loaded or replaced (S1), and whether a command relating to the setting of the IEEE 1394 output selector 204 has been received from the AV amplifier 3 (S2).

If a disc has been loaded or replaced (YES in S1), it is then determined whether or not the loaded disc is an SACD (S4). The disc reading section 201 reads, from the loaded disc, information identifying the type of the disc, and the disc-type information is input to the DVD system microcomputer 209. Thus, the determination of step S4 is done by the DVD system microcomputer 209 based on the disc-type information.

If the disc is not an SACD, i.e., if it is a DVD or a CD (NO in S4), the process proceeds to step S2. If the disc is an SACD (YES in S4), it is then determined whether or not the IEEE 1394 output selector 204 is in the "IEEE 1394 ON" setting. Information about the setting of the IEEE 1394 output selector 204 is input to the DVD system microcomputer 209 by the disc reading section 201. Thus, the determination is done by the DVD system microcomputer 209 based on the setting information.

If the IEEE 1394 output selector 204 is in the "IEEE 1394 ON" setting (YES in S5), it is determined whether or not the IEEE 1394 interface 206 is in such a condition that the IEEE 1394 interface 206 can exchange IEEE 1394 data with the IEEE 1394 interface 301 of the AV amplifier 3 (S6). The hardware connection between the IEEE 1394 interface 206 and the IEEE 1394 interface 301 and the software connection therebetween are controlled by the IEEE 1394 microcomputer 205, and the control information is input to the DVD system microcomputer 209. Thus, the determination of step S6 is done by the DVD system microcomputer 209 based on the control information.

If the connection is not in such a condition that data can be exchanged (NO in S6), the process proceeds to step S2 after the setting of the IEEE 1394 output selector 204 is switched to "IEEE 1394 OFF" (S7). Otherwise (YES in S6), the process proceeds to step S2 without switching the setting of the IEEE 1394 output selector 204.

If the IEEE 1394 output selector 204 is in the "IEEE 1394 OFF" setting in step S5 (NO in S5), the process proceeds to step S8, where it is determined whether or not the IEEE 1394 interface 206 is in such a condition that the IEEE 1394 interface 206 can exchange IEEE 1394 data with the IEEE 1394 interface 301 of the AV amplifier 3, as in step S6. If the condition is such that data can be exchanged (YES in S8), the process proceeds to step S2 after the setting of the IEEE 1394 output selector 204 is switched to "IEEE 1394 ON" (S9). Otherwise (NO in S8), the process proceeds to step S2 without switching the setting of the IEEE 1394 output selector 204.

Thus, where a disc has been loaded or replaced and the newly loaded disc is an SACD, if the IEEE 1394 interface 206 is in such a condition that the IEEE 1394 interface 206 can exchange IEEE 1394 data with the IEEE 1394 interface 301 of the AV amplifier 3, and if the IEEE 1394 output selector 204 is in the "IEEE 1394 ON" setting, the setting of the IEEE 1394 output selector 204 is kept to be "IEEE 1394 ON", so that data read from the SACD is sent to the AV amplifier 3 in the digital audio data format via the IEEE 1394 interface 206.

Where the newly loaded disc is an SACD, if the IEEE 1394 interface 206 is not in such a condition that the IEEE 1394 interface 206 can exchange IEEE 1394 data with the IEEE 1394 interface 301 of the AV amplifier 3, and if the IEEE 1394 output selector 204 is nevertheless in the "IEEE 1394 ON" setting, the setting of the IEEE 1394 output selector 204 is switched to "IEEE 1394 OFF", so that data read from the SACD can be sent to the AV amplifier 3 in the analog signal format.

If it is determined by the DVD system microcomputer 209 in step S2 that a command relating to the setting of the IEEE 1394 output selector 204 has been received from the AV amplifier 3 (YES in S2), it is then determined whether or not the received command is an "IEEE 1394 ON" command (S10). If the received command is an "IEEE 1394 OFF" command (NO in S10), the IEEE 1394 output selector 204 is set to "IEEE 1394 OFF" (S11) and the process proceeds to step S3. If the received command is an "IEEE 1394 ON" command (YES in S10), the IEEE 1394 output selector 204 is set to "IEEE 1394 ON" (S12) and the process proceeds to step S3. Thus, the command relating to the setting of the IEEE 1394 output selector 204 coming from the AV amplifier 3 is input to the disc reading section 201 from the IEEE 1394 output selector 204, and then the disc reading section 201 sets the IEEE 1394 output selector 204 according to the command.

Thus, if the IEEE 1394 interface 301 of the AV amplifier 3 is in such a condition that the IEEE 1394 interface 301 can exchange IEEE 1394 data with the IEEE 1394 interface 206 of the DVD player 2A, a command instructing to set the IEEE 1394 output selector 204 to "IEEE 1394 ON" is sent from the AV amplifier 3. If the IEEE 1394 interface 301 of the AV amplifier 3 is not in such a condition that the IEEE 1394 interface 301 can exchange IEEE 1394 data with the IEEE 1394 interface 206 of the DVD player 2A, a command instructing to set the IEEE 1394 output selector 204 to "IEEE 1394 OFF" is sent from the AV amplifier 3. Therefore, by setting the IEEE 1394 output selector 204 of the DVD player 2A based on the command, data read from an SACD can be sent in the digital audio data or analog signal format, which can be reproduced by the AV amplifier 3.

Figure 3:
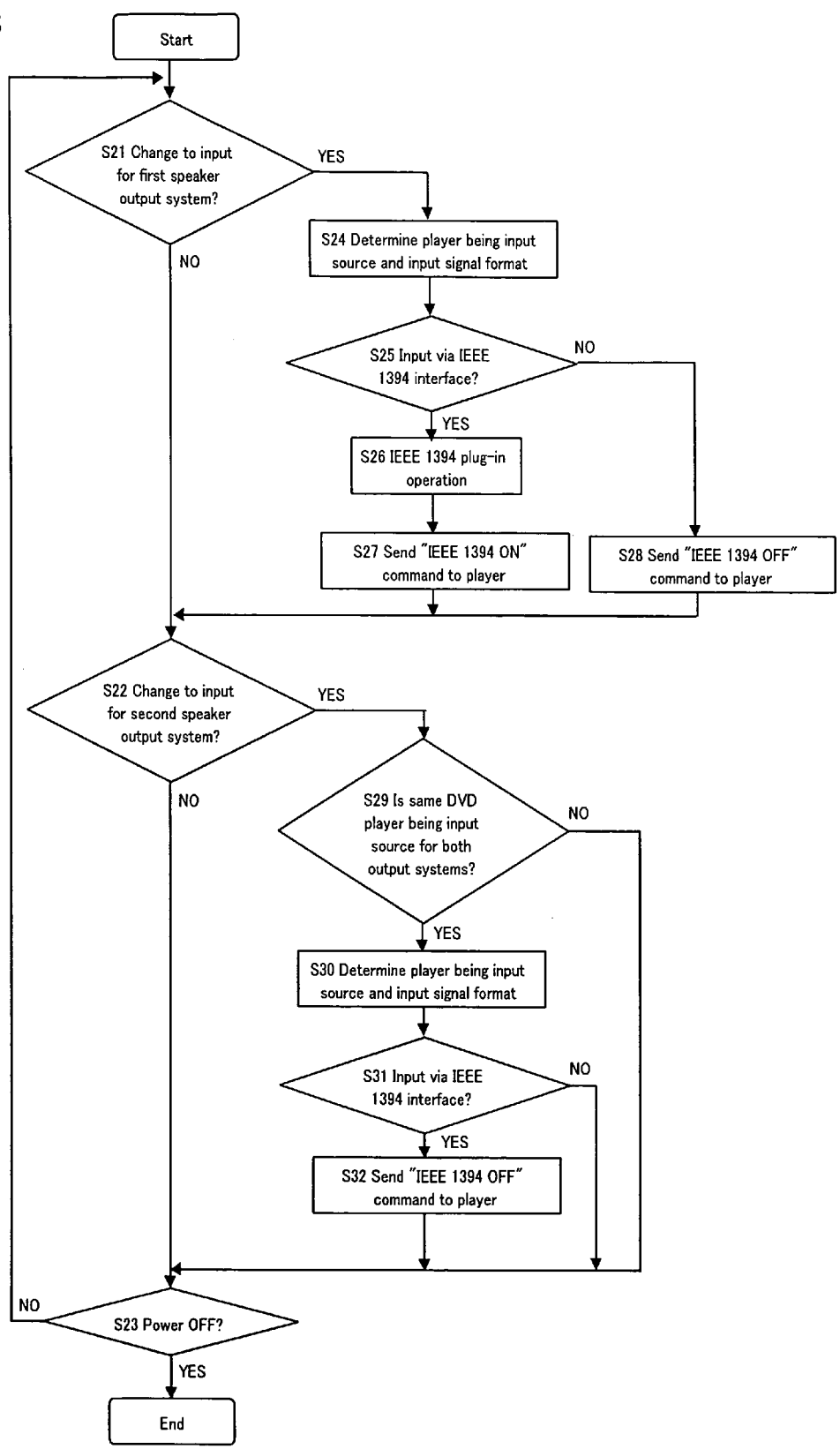
FIG. 3 is a flow chart showing a process relating to the switching of an IEEE 1394 selector in an AV amplifier.
Figure 4:
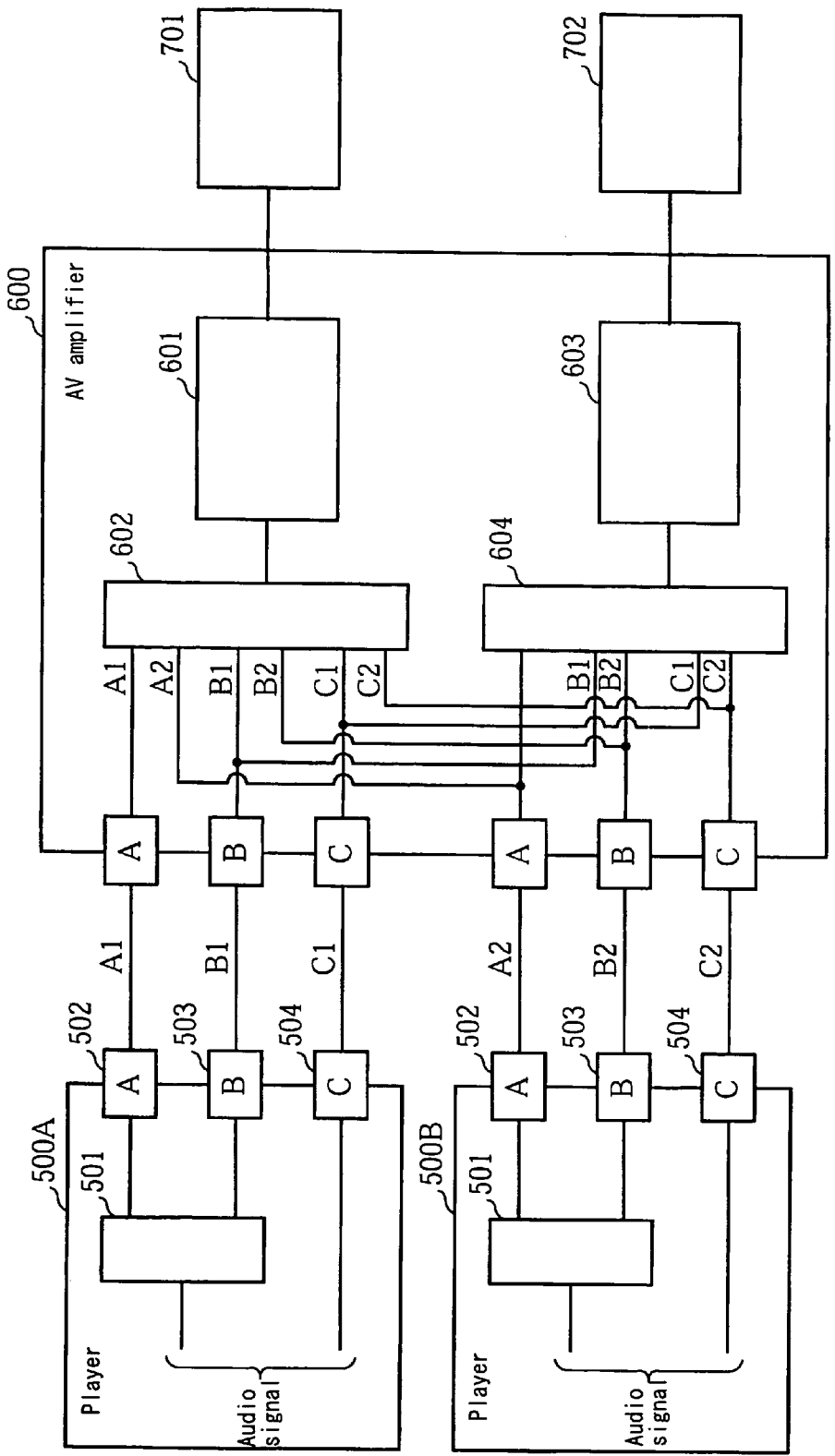
FIG. 4 is a block diagram showing a basic configuration of an audio system for illustrating a problem in the prior art in a generalized form.
Figure 5:
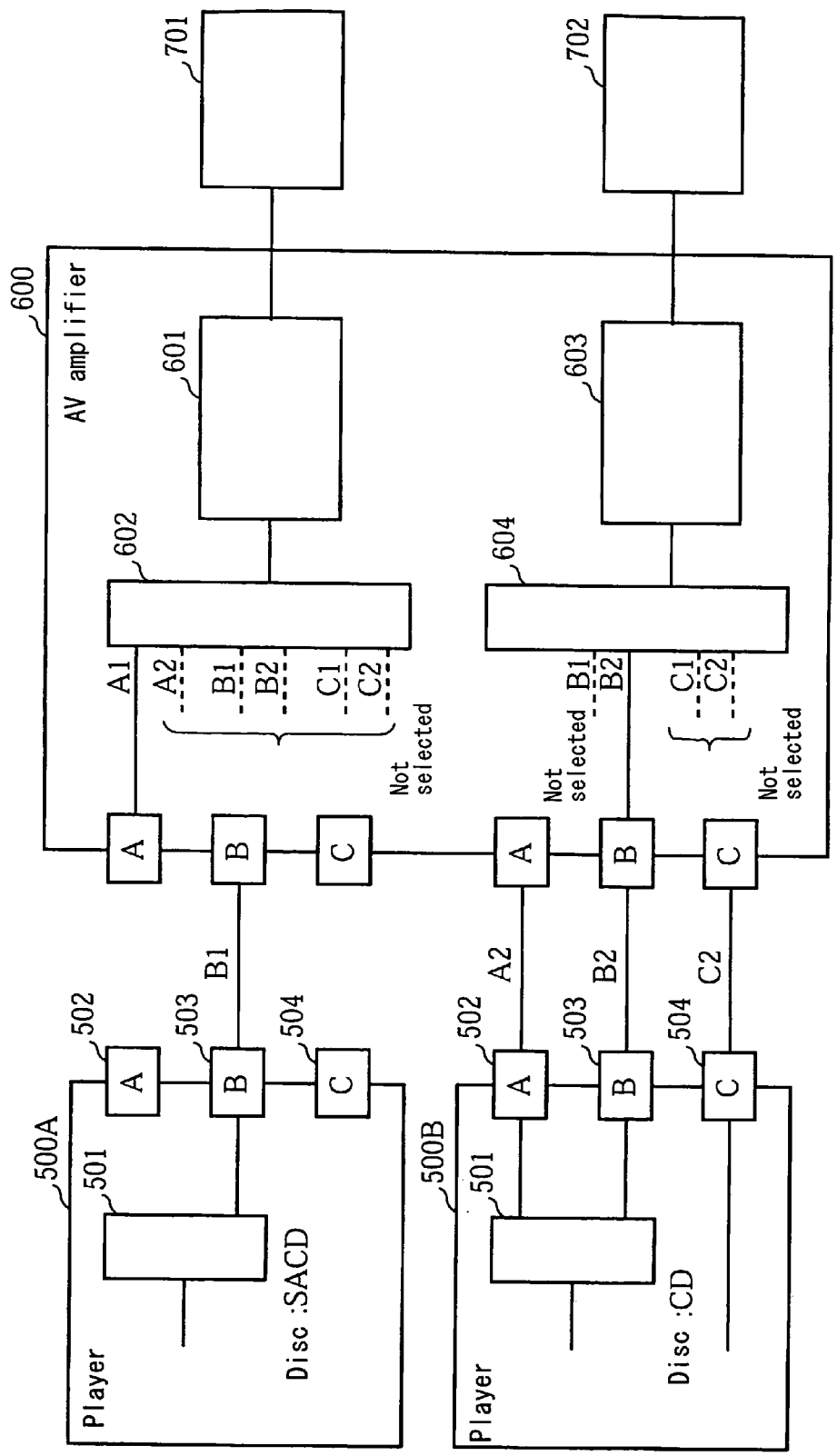
FIG. 5 shows a case where the output audio signal format of a player connected to a first speaker output system of an AV amplifier is not a format that can be reproduced through the first speaker output system.
Figure 6:
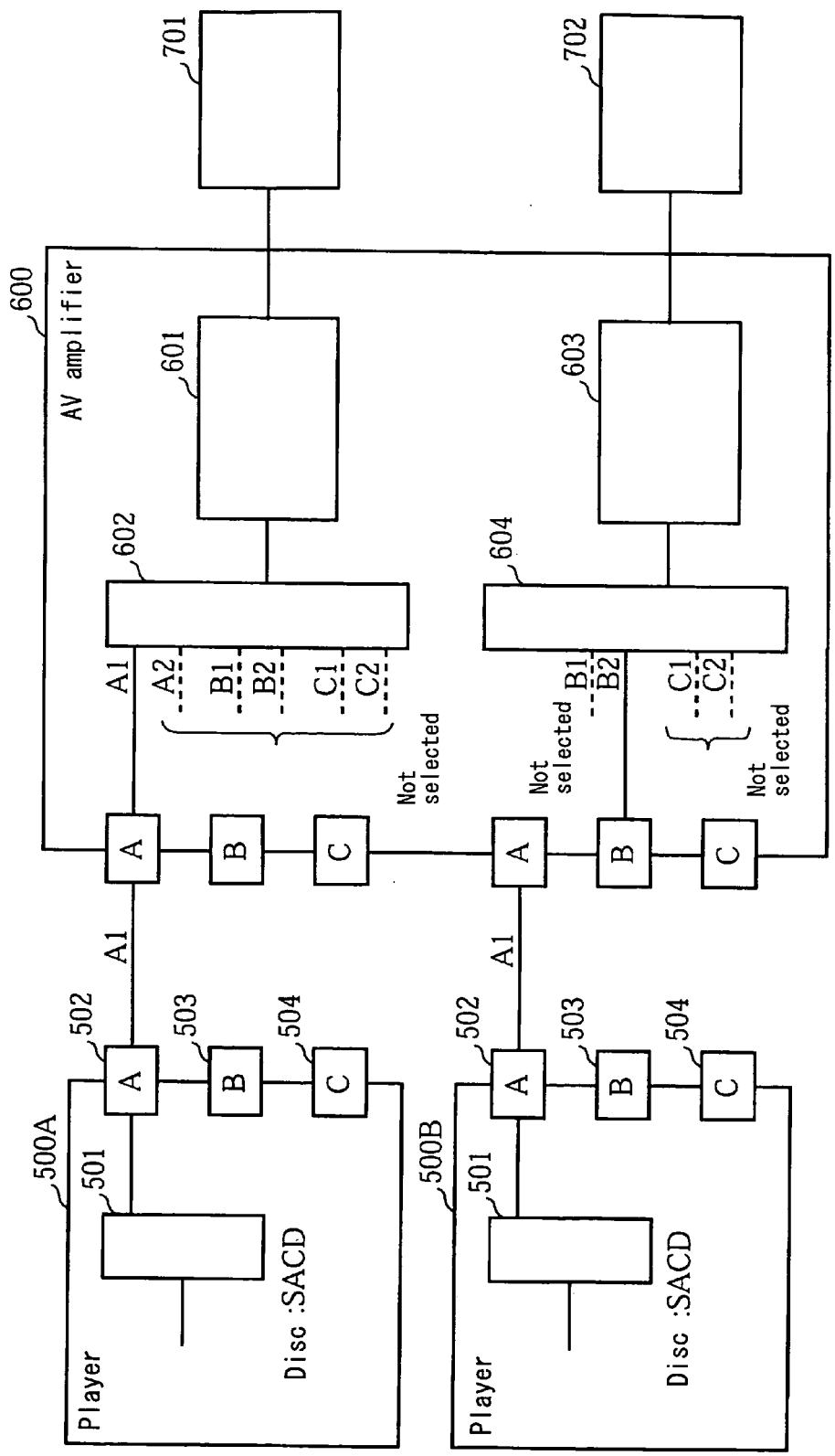
FIG. 6 shows a case where the output audio signal format of a player connected to a second speaker output system of an AV amplifier is not a format that can be reproduced through the second speaker output system.

FIG. 3 is a flow chart showing a process relating to the switching of the IEEE 1394 input selector 303 in the AV amplifier 3.

While the power of the AV amplifier 3 is ON, the process loops through steps S21 to S23, determining on each iteration whether there has been a change, through the user's operation of the control section 319, to the input of the first speaker output system or the input of the second speaker output system (S21 and S22). Specifically, it is determined whether or not there has been a change to the setting of the IEEE 1394 input selector 303, the first input selector 310, the analog input selector 306, the digital input selector 308 or the second input selector 314.

If there has been a change to the input of the first speaker output system (YES in S21), the DVD player from which input signals are received and the input signal format after the change are determined (S24). In the configuration of FIG. 1, the DVD player (2A or 2B) connected to the first speaker output system and the format of the signal output from the DVD player (2A or 2B) are determined based on the input signal format selected by the first input selector 310 and the input terminal portion selected by the input selector for that input signal format. For example, if the IEEE 1394 interface 301 is being selected by the first input selector 310 and the upper terminal portion of the IEEE 1394 interface 301 is being selected, the input to the first speaker output system is determined to be digital audio data input from the DVD player 2A via the IEEE 1394 interface 301. If the analog input terminal is being selected by the first input selector 310 and the lower terminal portion of the analog input terminal 305 is being selected, the input to the first speaker output system is determined to be an analog audio signal input from the DVD player 2B via the analog input terminal 305.

Then, it is determined whether or not the selected input signal is an input signal from the IEEE 1394 interface 301 (S25). If so (YES in S25), an IEEE 1394 plug-in operation with the selected DVD player is performed (S26). Specifically, in the above example, the IEEE 1394 microcomputer 302 of the AV amplifier 3 communicates with the IEEE 1394 microcomputer 205 of the DVD player 2A to check the physical connection between the IEEE 1394 interface 206 and the IEEE 1394 interface 301 and to perform an authentication process for enabling data exchange therebetween.

After the IEEE 1394 plug-in operation, the process proceeds to step S22 after an "IEEE 1394 ON" command is sent from the AV system microcomputer 318 of the AV amplifier 3 to the DVD system microcomputer 209 of the selected DVD player (the DVD player 2A in the above example) (S27).

If the selected input signal is not an input signal from the IEEE 1394 interface 301 (NO in S25), the process proceeds to step S22 after an "IEEE 1394 OFF" command is sent from the AV system microcomputer 318 of the AV amplifier 3 to the DVD system microcomputer 209 of the selected DVD player (the DVD player 2A in the above example) (S27). Note that the command sending operation of steps S27 and S28 corresponds to step S2 in the flow chart of FIG. 2.

The process of steps S21 and S24 to S28 can be summarized as follows. If the input signal to the first speaker output system is digital audio data from the IEEE 1394 interface 301, an "IEEE 1394 ON" command is sent to the DVD player (2A or 2B) connected to the first speaker output system so that digital audio data is output from the DVD player (2A or 2B) via the IEEE 1394 interface 206. If the input signal to the first speaker output system is an analog audio signal or digital audio data from the analog input terminal 305 or the digital input terminal 307, an "IEEE 1394 OFF" command is sent to the DVD player (2A or 2B) connected to the first speaker output system so that digital audio data is not output from the DVD player (2A or 2B) via the IEEE 1394 interface.

As a result, even if an SACD is loaded in the DVD player (2A or 2B) connected to the first speaker output system, the data read from the SACD can reliably be reproduced from the first speaker system 4A via the first speaker output system.

Then, if it is determined in step S22 that there has been a change to the second speaker output system (YES in S22), it is determined whether or not the first speaker output system and the second speaker output system are to receive signals from the same DVD player (S29). If not (NO in S29), the process proceeds to step S23. If so (YES in S29), the DVD player from which signals are input to the first speaker output system and the input signal format are determined (S30). This determination process is similar to that of step S24. For example, if the IEEE 1394 interface 301 is being selected by the first input selector 310 and the upper terminal portion of the IEEE 1394 interface 301 is being selected, it is determined that the input to the first speaker output system and the second speaker output system is digital audio data input from the DVD player 2A via the IEEE 1394 interface 301. If the analog input terminal 305 is being selected by the first input selector 310 and the upper terminal portion of the analog input terminal 305 is being selected, the input to the first speaker output system and the second speaker output system is an analog audio signal input from the DVD player 2A via the analog input terminal 305.

Then, it is determined whether or not the input signal to the first speaker output system is an input signal from the IEEE 1394 interface 301 (S31). If not (NO in S31), the process proceeds to step S23. If so (YES in S31), the process proceeds to step S32. Thus, in steps S29 to S31, it is determined whether or not the output from the DVD player, from which signals are input to the second speaker output system, is an output via the IEEE 1394 interface 301.

Then, an "IEEE 1394 OFF" command is sent from the AV system microcomputer 318 of the AV amplifier 3 to the DVD system microcomputer 209 of the selected DVD player in step S32, and the process proceeds to step S23. Note that the command sending operation of step S32 corresponds to step S2 in the flow chart of FIG. 2.

The process of steps S22 and S29 to S32 can be summarized as follows. Since the input signal formats that can be reproduced through the second speaker output system do not include digital audio data from the IEEE 1394 interface 301, an "IEEE 1394 OFF" command is sent to the DVD player (2A or 2B) connected to the second speaker output system so that digital audio data is not output from the DVD player (2A or 2B) via the IEEE 1394 interface 206.

As a result, even if an SACD is loaded in the DVD player (2A or 2B) connected to the second speaker output system, the data read from the SACD is output as an analog audio signal via the analog output terminal 207 so that it can reliably be reproduced from the second speaker system 4B via the second speaker output system.

As described above, in the audio system of the present embodiment, if the output audio signal format of the DVD player (2A or 2B) connected to the first speaker output system or the second speaker output system of the AV amplifier 3 is not a format that can be reproduced through the first speaker output system or the second speaker output system, the setting of the IEEE 1394 output selector 204 is switched, automatically by the DVD player (2A or 2B) or by means of a command from the AV amplifier 3, to a setting such that the output audio signal format is a format that can be reproduced through the first speaker output system or the second speaker output system. As a result, even if a special type of a disc with a limited output format variation, such as an SACD, is loaded in the DVD players 2A and 2B, data read from the DVD player (2A or 2B) connected to the first or second speaker output system of the AV amplifier 3 can reliably be reproduced without the user manually adjusting the selectors of the DVD players 2A and 2B and those of the AV amplifier 3.

While the AV amplifier 3 of the audio system of the embodiment described above includes only one first speaker output system and only one second speaker output system, the present invention can also be applied to an audio system using an AV amplifier that includes a plurality of first speaker output systems and a plurality of second speaker output systems. In other words, the present invention is applicable to any audio system using an AV amplifier that includes a plurality of speaker output systems, at least including a first speaker output system capable of reproducing audio data from an IEEE 1394 interface and a second speaker output system not capable of reproducing audio data from an IEEE 1394 interface.

What is claimed is:

1. An audio system, comprising a disc reproduction device and an audio output control device, wherein:
   the disc reproduction device includes:
      a disc reading section for reading audio data recorded on a disc;
      a first signal output section for outputting the audio data in a first signal format;
      a second signal output section for outputting the audio data in a second signal format different from the first signal format;
      an output selection section for selecting whether the audio data read by the disc reading section is output in the first or second signal format; and
      an output selection controller for controlling the selection operation by the output selection section;
   the audio output control device includes:
      a first signal input section for receiving audio data of the first signal format;
      a second signal input section for receiving audio data of the second signal format;
      an audio output processing section for outputting the audio data of the first signal format or the second signal format to a sound generator;
      an input selection section for selecting one of a plurality of audio data received from the first and second signal input sections and inputting the selected audio data to the audio output processing section; and
      an input selection controller for controlling the selection operation by the input selection section;
   the disc reproduction device further includes a determination section for determining whether or not data can be exchanged between the first signal output section and the first signal input section; and
   the output selection controller controls the selection operation by the output selection section so that audio data read by the disc reading section is output in the first signal format if audio data can be exchanged between the first signal output section and the first signal input section whereas the audio data read by the disc reading section is output in the second signal format if audio data cannot be exchanged between the first signal output section and the first signal input section.

2. The audio system according to claim 1, wherein the first signal format is a signal format in compliance with IEEE 1394, and the second signal format is an analog audio signal format.

3. The audio system according to claim 1, wherein:
   the disc reproduction device further includes a disc type determination section for determining whether or not a loaded disc is of a predetermined type; and
   the output selection controller controls the selection operation by the output selection section if the disc type determination section determines that a disc of the predetermined type is being loaded.

4. A disc reproduction device, comprising:
   a disc reading section for reading audio data recorded on a disc;
   a first signal output section for outputting the audio data in a first signal format;
   a second signal output section for outputting the audio data in a second signal format different from the first signal format;
   an output selection section for selecting whether the audio data read by the disc reading section is output in the first or second signal format;
   a determination section for determining whether or not data can be exchanged between the first signal output section and a first signal input section of an audio output control device for receiving audio data of the first signal format; and
   an output selection controller for controlling the selection operation by the output selection section so that audio data read by the disc reading section is output in the first signal format if data can be exchanged between the first signal output section and the first signal input section whereas the audio data read by the disc reading section is output in the second signal format if data cannot be exchanged between the first signal output section and the first signal input section.

5. The disc reproduction device according to claim 4, wherein the first signal format is a signal format in compliance with IEEE 1394, and the second signal format is an analog audio signal format.

6. The disc reproduction device according to claim 4, wherein:
   the disc reproduction device further includes a disc type determination section for determining whether or not a loaded disc is of a predetermined type; and
   the output selection controller controls the selection operation by the output selection section if the disc type determination section determines that a disc of the predetermined type is being loaded.

7. An audio system, comprising a disc reproduction device and an audio output control device, wherein:
the disc reproduction device includes:
a disc reading section for reading audio data recorded on a disc;
a first signal output section for outputting the audio data in a first signal format;
a second signal output section for outputting the audio data in a second signal format different from the first signal format;
an output selection section for selecting whether the audio data read by the disc reading section is output in the first or second signal format; and
an output selection controller for controlling the selection operation by the output selection section;
the audio output control device includes:
a first signal input section for receiving the audio data output from the first signal output section;
a second signal input section for receiving the audio data output from the second signal output section;
a first audio output processing section for outputting audio data of the first signal format or the second signal format to a first sound generator;
a first input selection section for selecting one of a plurality of audio data received from the first and second signal input sections and inputting the selected audio data to the first audio output processing section; and
an input selection controller for controlling the selection operation by the first input selection section;
the audio output control device further includes:
a determination section for determining whether or not the audio data output from the first signal output section of the disc reproduction device is being selected among the audio data input from the first signal input section via the first input selection section; and
a command sending section for sending, to the output selection controller of the disc reproduction device, a command instructing the output selection controller of the disc reproduction device to output the audio data read by the disc reading section in the first signal format if it is determined by the determination section that the audio data output from the first signal output section of the disc reproduction device is being selected, and sending, to the output selection controller of the disc reproduction device, a command instructing the output selection controller of the disc reproduction device to output the audio data read by the disc reading section in the second signal format if it is determined by the determination section that the audio data output from the first signal output section of the disc reproduction device is not being selected; and
the output selection controller of the disc reproduction device controls the selection operation by the output selection section based on the command sent from the command sending section.

8. The audio system according to claim 7, wherein:
the audio output control device further includes:
a second audio output processing section for outputting audio data of the second signal format to a second sound generator;
a second input selection section for selecting one of a plurality of audio data received from the second signal input section and inputting the selected audio data to the second audio output processing section;
a second determination section for determining whether or not the audio data output to the second input selection section from the disc reproduction device is in the first signal format; and
a second command sending section for sending, to the output selection controller of the disc reproduction device, a command instructing the output selection controller of the disc reproduction device to output the audio data read by the disc reading section in the second signal format if it is determined by the second determination section that the audio data output from the disc reproduction device is in the first signal format; and
the output selection controller of the disc reproduction device controls the selection operation by the output selection section based also on the command sent from the second command sending section.

9. The audio system according to claim 7, wherein the first signal format is a signal format in compliance with IEEE 1394, and the second signal format is an analog audio signal format.

10. A disc reproduction device, comprising:
a disc reading section for reading audio data recorded on a disc;
a first signal output section for outputting the audio data in a first signal format;
a second signal output section for outputting the audio data in a second signal format different from the first signal format;
an output selection section for selecting whether the audio data read by the disc reading section is output in the first or second signal format; and
an output selection controller for controlling the selection operation by the output selection section; wherein:
the disc reproduction device can be connected to an audio output control device;
the audio output control device includes:
a first signal input section for receiving the audio data output from the first signal output section;
a second signal input section for receiving the audio data output from the second signal output section;
a first audio output processing section for outputting audio data of the first signal format or the second signal format to a first sound generator;
a first input selection section for selecting one of a plurality of audio data received from the first and second signal input sections and inputting the selected audio data to the first audio output processing section;
an input selection controller for controlling the selection operation by the first input selection section;
a determination section for determining whether or not the audio data output from the first signal output section is being selected among the audio data input from the first signal input section via the first input selection section; and
a command sending section for sending a command instructing to output the audio data read by the disc reading section in the first signal format if it is determined by the determination section that the audio data output from the first signal output section is being selected, and sending a command instructing to output the audio data read by the disc reading section in the second signal format if it is determined by the determination section that the audio data output from the first signal output section of the disc reproduction device is not being selected; and the disc reproduction device further comprises an output selection controller for controlling the selection operation by the output selection section based on the command sent from the command sending section.

11. The disc reproduction device according to claim 10, wherein:
the audio output control device further includes:
a second audio output processing section for outputting audio data of the second signal format to a second sound generator;
a second input selection section for selecting one of a plurality of audio data received from the second signal input section and inputting the selected audio data to the second audio output processing section;
a second determination section for determining whether or not the audio data output to the second input selection section from the disc reproduction device is in the first signal format; and
a second command sending section for sending, to the output selection controller of the disc reproduction device, a command instructing the output selection controller of the disc reproduction device to output the audio data read by the disc reading section in the second signal format if it is determined by the second determination section that the audio data output from the disc reproduction device is in the first signal format; and
the output selection controller controls the selection operation by the output selection section based also on the command sent from the second command sending section.

12. The disc reproduction device according to claim 10, wherein the first signal format is a signal format in compliance with IEEE 1394, and the second signal format is an analog audio signal format.

13. An audio output control device comprising:
a first signal input section for receiving audio data of a first signal format output from a first signal output section of a disc reproduction device;
a second signal input section for receiving audio data of a second signal format output from a second signal output section of the disc reproduction device;
a first audio output processing section for outputting audio data of the first signal format or the second signal format to a first sound generator;
a first input selection section for selecting one of a plurality of audio data received from the first and second signal input sections and inputting the selected audio data to the first audio output processing section;
an input selection controller for controlling the selection operation by the first input selection section;
a determination section for determining whether or not the audio data output from the first signal output section of the disc reproduction device is being selected among the audio data input from the first signal input section via the first input selection section;
a command sending section for sending, to the disc reproduction device, a command instructing the disc reproduction device to output audio data read by a disc reading section in the first signal format if it is determined by the determination section that the audio data output from the first signal output section of the disc reproduction device is being selected, and sending, to the disc reproduction device, a command instructing the disc reproduction device to output the audio data read by the disc reading section in the second signal format if it is determined by the determination section that the audio data output from the first signal output section of the disc reproduction device is not being selected.

14. The audio output control device according to claim 13, further comprising:
a second audio output processing section for outputting audio data of the second signal format to a second sound generator;
a second input selection section for selecting one of a plurality of audio data received from the second signal input section and inputting the selected audio data to the second audio output processing section;
a second determination section for determining whether or not the audio data output to the second input selection section from the disc reproduction device is in the first signal format; and
a second command sending section for sending, to the disc reproduction device, a command instructing the disc reproduction device to output the audio data read by the disc reading section in the second signal format if it is determined by the second determination section that the audio data output from the disc reproduction device is in the first signal format.

15. The audio output control device according to claim 13, wherein the first signal format is a signal format in compliance with IEEE 1394, and the second signal format is an analog audio signal format.

16. An audio system, comprising a disc reproduction device and an audio output control device, wherein:
the disc reproduction device includes:
a disc reading section for reading audio data recorded on a disc;
a first signal output section for outputting the audio data in a first signal format;
a second signal output section for outputting the audio data in a second signal format different from the first signal format;
an output selection section for selecting whether the audio data read by the disc reading section is output in the first or second signal format; and
an output selection controller for controlling the selection operation by the output selection section;
the audio output control device includes:
a first signal input section for receiving the audio data output from the first signal output section;
a second signal input section for receiving the audio data output from the second signal output section;
a first audio output processing section for outputting audio data of the first signal format or the second signal format to a first sound generator;
a second audio output processing section for outputting audio data of the second signal format to a second sound generator;
a first input selection section for selecting one of a plurality of audio data received from the first and second signal input sections and inputting the selected audio data to the first audio output processing section;
a second input selection section for selecting one of a plurality of audio data received from the second signal input section and inputting the selected audio data to the second audio output processing section; and
an input selection controller for controlling the selection operation by the first and second input selection section;

the audio output control device further includes:
- a determination section for determining whether or not the audio data output to the second input selection section from the disc reproduction device is in the first signal format; and
- a command sending section for sending, to the output selection controller of the disc reproduction device, a command instructing the output selection controller of the disc reproduction device to output the audio data read by the disc reading section in the second signal format if it is determined by the determination section that the audio data output from the disc reproduction device is in the first signal format; and the output selection controller of the disc reproduction device controls the selection operation by the output selection section based on the command sent from the command sending section.

17. A disc reproduction device, comprising:

a disc reading section for reading audio data recorded on a disc;

a first signal output section for outputting the audio data in a first signal format;

a second signal output section for outputting the audio data in a second signal format different from the first signal format;

an output selection section for selecting whether the audio data read by the disc reading section is output in the first or second signal format, and
- an output selection controller for controlling the selection operation by the output selection section;

wherein:

the disc reproduction device can be connected to an audio output control device;

the audio output control device includes:
- a first signal input section for receiving the audio data output from the first signal output section;
- a second signal input section for receiving the audio data output from the second signal output section;
- a first audio output processing section for outputting audio data of the first signal format or the second signal format to a first sound generator;
- a second audio output processing section for outputting audio data of the second signal format to a second sound generator;
- a first input selection section for selecting one of a plurality of audio data received from the first and second signal input sections and inputting the selected audio data to the first audio output processing section;
- a second input selection section for selecting one of a plurality of audio data received from the second signal input section and inputting the selected audio data to the second audio output processing section;
- an input selection controller for controlling the selection operation by the first and second input selection section;
- a determination section for determining whether or not the audio data output to the second input selection section from the disc reproduction device is in the first signal format; and
- a command sending section for sending, to the output selection controller of the disc reproduction device, a command instructing the output selection controller of the disc reproduction device to output the audio data read by the disc reading section in the second signal format if it is determined by the determination section that the audio data output from the disc reproduction device is in the first signal format; and the output selection controller of the disc reproduction device controls the selection operation by the output selection section based on the command sent from the command sending section.

18. An audio output control device comprising:

a first signal input section for receiving audio data of a first signal format output from a first signal output section of a disc reproduction device;

a second signal input section for receiving audio data of a second signal format output from a second signal output section of the disc reproduction device;

a first audio output processing section for outputting audio data of the first signal format or the second signal format to a first sound generator;

a second audio output processing section for outputting audio data of the second signal format to a second sound generator;

a first input selection section for selecting one of a plurality of audio data received from the first and second signal input sections and inputting the selected audio data to the first audio output processing section;

a second input selection section for selecting one of a plurality of audio data received from the second signal input section and inputting the selected audio data to the second audio output processing section;

an input selection controller for controlling the selection operation by the first and second input selection section;

a determination section for determining whether or not the audio data output to the second input selection section from the disc reproduction device is in the first signal format; and a command sending section for sending, to the output selection controller of the disc reproduction device, a command instructing the output selection controller of the disc reproduction device to output the audio data read by the disc reading section in the second signal format if it is determined by the determination section that the audio data output from the disc reproduction device is in the first signal format.

* * * * *